UNITED STATES PATENT OFFICE.

AMBROSE G. FELL, OF NEW YORK, N. Y.

IMPROVEMENT IN THE PROCESSES OF WATERPROOFING PAPER.

Specification forming part of Letters Patent No. 147,833, dated February 24, 1874; application filed November 12, 1873.

*To all whom it may concern:*

Be it known that I, AMBROSE G. FELL, of the city, county, and State of New York, have invented a new and Improved Process of Treating Paper, of which the following is a specification:

My invention has for its object to furnish, and consists in, an improved process of treating paper for paper collars, cuffs, and bosoms, show-cards, window-shades, and other uses, by means of which the paper may be so prepared that it will resist the action of moisture; will not mildew, change color, or otherwise decompose; will require less coloring matter to color it; will add brightness to the colors used, and render them insolubly fast; will render it capable of being more readily polished by friction, and will require much less material for enameling it than ordinary paper; and will better prepare it for various other purposes too numerous to mention.

The paper to be operated upon must be well sized, either in the pulp or in sheets—animal sizings preferred.

In carrying my process into practical effect, I prepare a solution of alumina in sulphuric acid by dissolving about a pound and a half of alumina in a gallon of sulphuric acid, commercial strength, and dilute the solution with a gallon of water. The diluted solution is then well mixed, and allowed to stand about twenty-four hours. The surface of the sized paper is then thoroughly wetted with the alumina solution, either by immersing the paper in the solution, or in any other convenient way. The sized paper, while still wet with the alumina solution, is passed through a solution of carbonate of soda, or other precipitant of alumina in water, to precipitate the alumina within the pores of the paper, and the wet paper is then dried in the ordinary way, and is ready for use.

Having thus described my invention, I claim as new and desire to secure by Letters Patent—

The process of treating sized paper with a solution of alumina in sulphuric acid, and afterward in a solution of carbonate of soda, or other precipitant of alumina, in water, substantially as herein set forth.

AMBROSE GEORGE FELL.

Witnesses:
OSCAR ALBERT BIERSTADT,
JOSEPH AUSTIN LEONARD.